United States Patent [19]
Pranis, Jr.

[11] 3,898,958
[45] Aug. 12, 1975

[54] OPEN WATER FISH FARMING APPARATUS

[76] Inventor: Peter P. Pranis, Jr., 4108 W. 217th St., Fairview Park, Ohio 44126

[22] Filed: June 13, 1974

[21] Appl. No.: 478,980

[52] U.S. Cl. .................................. 119/3; 119/4
[51] Int. Cl. ................................... A01k 61/00
[58] Field of Search .......... 119/3, 4, 2; 52/637, 648; 61/46.5

[56] References Cited
UNITED STATES PATENTS

| | | | |
|---|---|---|---|
| 3,316,881 | 5/1967 | Fischer | 119/4 |
| 3,561,402 | 2/1971 | Ishida | 119/3 |
| 3,564,802 | 2/1971 | Dreyfus | 52/637 |
| 3,695,229 | 10/1972 | Renn | 119/4 |

Primary Examiner—Hugh R. Chamblee
Attorney, Agent, or Firm—Donnelly, Maky, Renner & Otto

[57] ABSTRACT

An apparatus for creating the effect of an artificial reef to provide in bulk large surface areas for the anchoring, growth and accumulation of micro-organisms which provide a food supply for small fish. The artificial reef is in the form of a three dimensional geometrical lattice framework which also includes various means for sheltering small fish from larger fish, their natural predators, and means are also provided to compartmentalize various portions of the members forming such lattice framework. The overall lattice framework may be sufficiently large so as to provide breakwater function.

37 Claims, 15 Drawing Figures

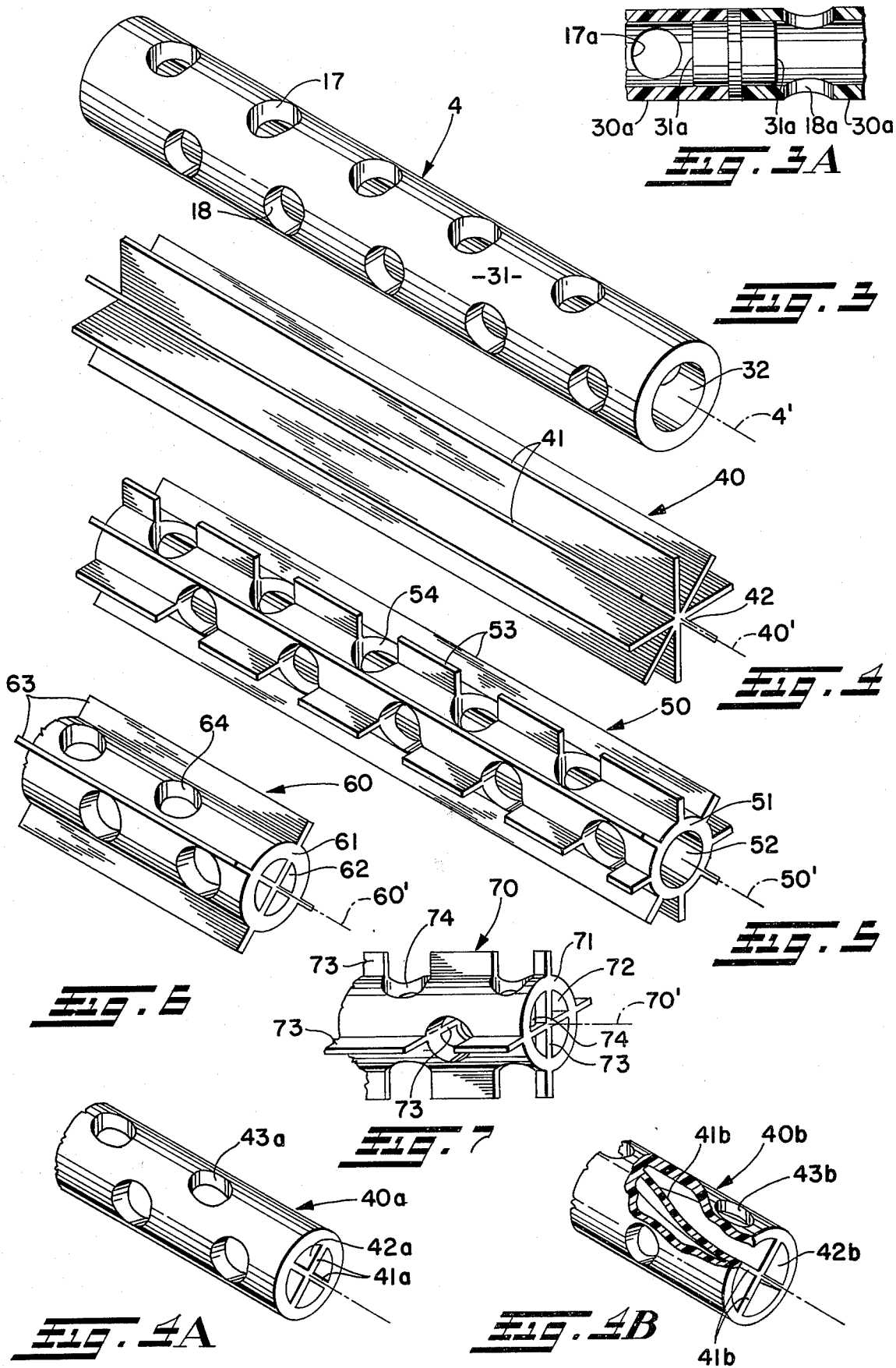

PATENTED AUG 12 1975    3,898,958
SHEET 3
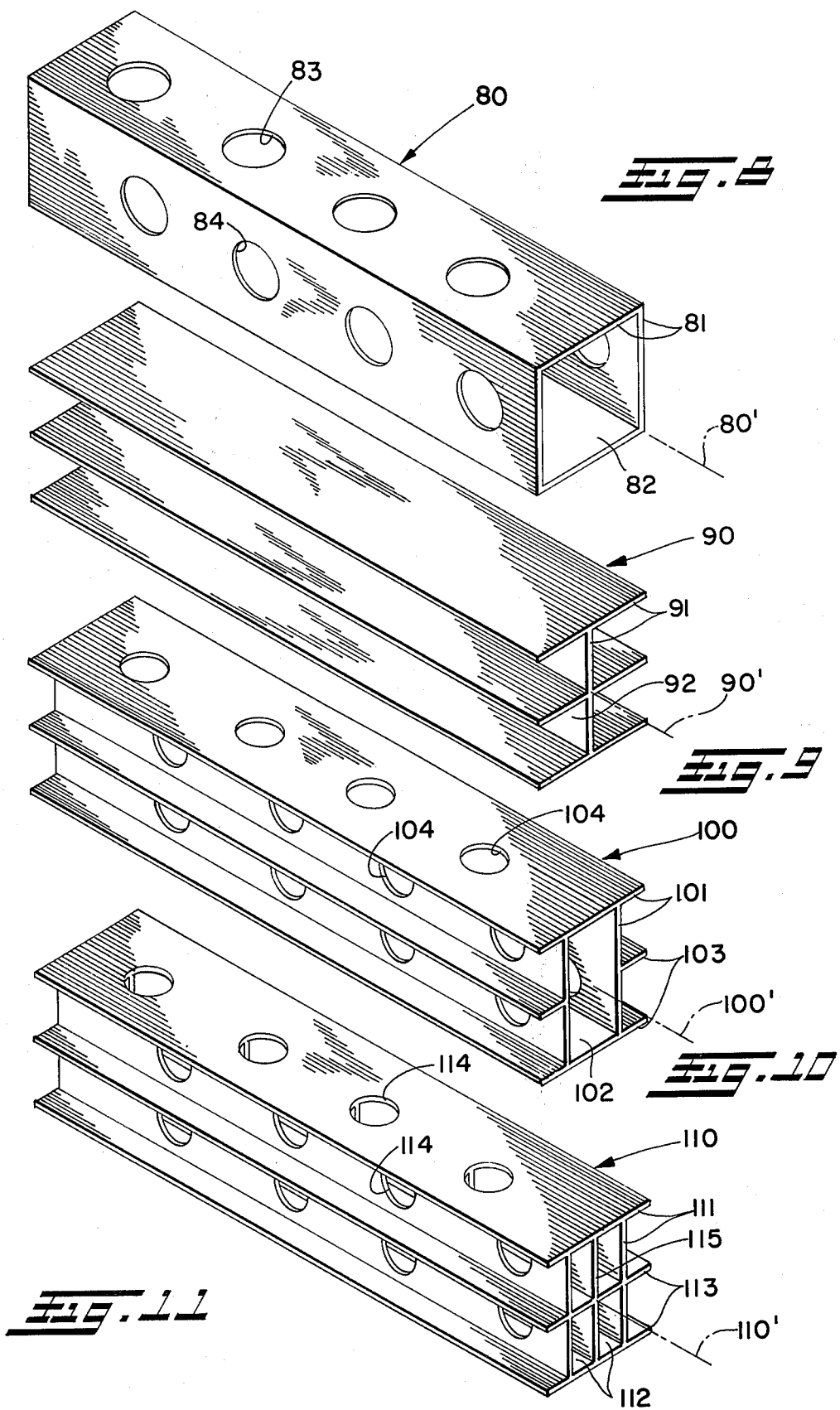

3,898,958

OPEN WATER FISH FARMING APPARATUS

BACKGROUND OF THE INVENTION

This invention relates to an artificial fish farming apparatus, and more particularly relates to an apparatus which provides large surface areas for the anchoring and growth of micro-organisms and areas of shelter for small fish.

With the ever increasing pollution of our natural resources, which has now come to include the vast oceans of the world and their tidelands coupled with the continued depletion of fish resources in the oceans, it is desirable to increase economically the fish population without adding to ecological pollution. Moreover, scientists suggest that the future of the world food supply lies in the resources supplied by the oceans. For these and other reasons it is desirable to create an effective artificial reef primarily for the cultivation or breeding of fish and which secondarily may be readily adapted as a non-polluting relatively inexpensive breakwater for deep water ports and the like.

A large portion of the world's continental shelf areas consists of sandy bottoms which close to biological deserts, supporting a very low density of aquatic life. One reason for such lack of aquatic life is the absence of solid surfaces to which micro-organisms may anchor to provide the foundation for the aquatic food chain, whereby small fish, including recent hatchlings and naturally small fish, feed on such micro-organisms and then provide a food source for larger fish, attracting the same to that locale, and themselves growing to become larger fish. Although the surfaces provided by drilling platforms, wrecks, abandoned automobiles, concrete pilings and the like have provided such surface areas over relatively small portions of the ocean bottom and at relatively large cost, it is desirable to provide such surfaces over relatively large extents of the continental shelf at a reasonable cost.

Moreover, breakwaters for diminishing the size of waves in the ocean are becoming increasingly more important with the increased value of equipment used proximate the ocean shore as well as at off-shore locations. A drawback, however, to off-shore unloading points servicing deep water bulk carriers is the large forces that such a structure must be capable of withstanding due to ocean waves. One prior art technique for breaking up the waves has been to dump large boulders in the ocean to create a barrier, and another barrier creating technique has been to sink a ship in position to block the wave effect from the area to be protected. Each of these and other prior art techniques for creating breakwaters is expensive and usually only capable of a single function.

SUMMARY OF THE INVENTION

In the instant invention a geometric lattice framework formed of a number of connected elongated members is preferably placed on the ocean bottom or, if desired, suspended, for example, in mid-ocean to provide substantially stationary surfaces to support the aquatic food chain indicated. Thus, the lattice may be considered a feeding trough being a fixed point of attraction for otherwise migratory creatures by providing a plentiful food supply and a relatively sheltered area for breeding fish for fish farming in open waters without extensive barriers commonly used to pen the fish in a localized area.

Each of the elongated members forming individual arms in the geometric lattice framework will be referred to hereinafter as a pipe, and each pipe may be a conventional substantially hollow cylindrical or rectangular cross-section member.

Alternatively the elongated structural elements may comprise a number of planar surfaces extending parallel to the longitudinal axis thereof in a star-shape cross-section or back-to-back E-shape cross-section, or the like. Each of the pipes provides relatively large surface areas on which micro-organisms can become anchored and grow providing a food supply to small fish. Some of the small fish may then be eaten by large fish while other of the small fish may find shelter from larger fish, their natural predators, by hiding in and among the pipes.

The pipes may be coupled to form respective basic units of a matrix defining the overall lattice structure. Moreover, the shape, size, overall design, and color of the individual members and the overall lattice may be readily varied to provide various desired functions. For example, the overall lattice dimensions may be chosen to determine the fish population it will support in the oceanographic environment in which it is submerged. Although a single massive lattice may be preferred for commercial fishing purposes, smaller and more numerous lattices may be preferred in charter boat fishing areas for the pleasure of the sportsman. Also, the lattice may be of adequate size to perform both breakwater and fish farming functions.

A primary object of the invention is to provide a basis for a stationary food supply and shelter for fish.

It is another object of the invention to breed and to cultivate fish, especially in the oceans.

An additional object of the invention is to smooth wave formations as an artificial breakwater.

Still another object of the invention is to provide the basis for the aquatic food chain, whereby micro-organisms may become attached to a surface and grow to provide a food supply for small fish, the small fish grow and mature into larger fish while also providing a food supply to already existing larger fish, thus creating an attraction therefor, and the invention includes the provision of shelter areas for the small fish from their natural predators.

Still an additional object of the invention is to provide a geometric framework which is easily assembled, relatively inexpensive, almost indefinitely expandable, and effective in providing the basis for a stationary food supply and a shelter for small fish and to provide breakwater functions.

BRIEF DESCRIPTION OF THE DRAWINGS

In the annexed drawings:

FIGS. 3, 4, 4A, 4B and 5 through 11 are isometric views of various elongated members or pipes for inclusion in the basic structural units and lattice framework illustrated in FIGS. 1, 1A and 2; and FIG. 3A is a side view of a pipe with a compartmentalizing spacer for inclusion in the various hollow type pipes for use in the basic structural units and lattice framework illustrated in FIGS. 1, 1A and 2.

DESCRIPTION OF THE PREFERRED EMBODIMENT

Figure 1:
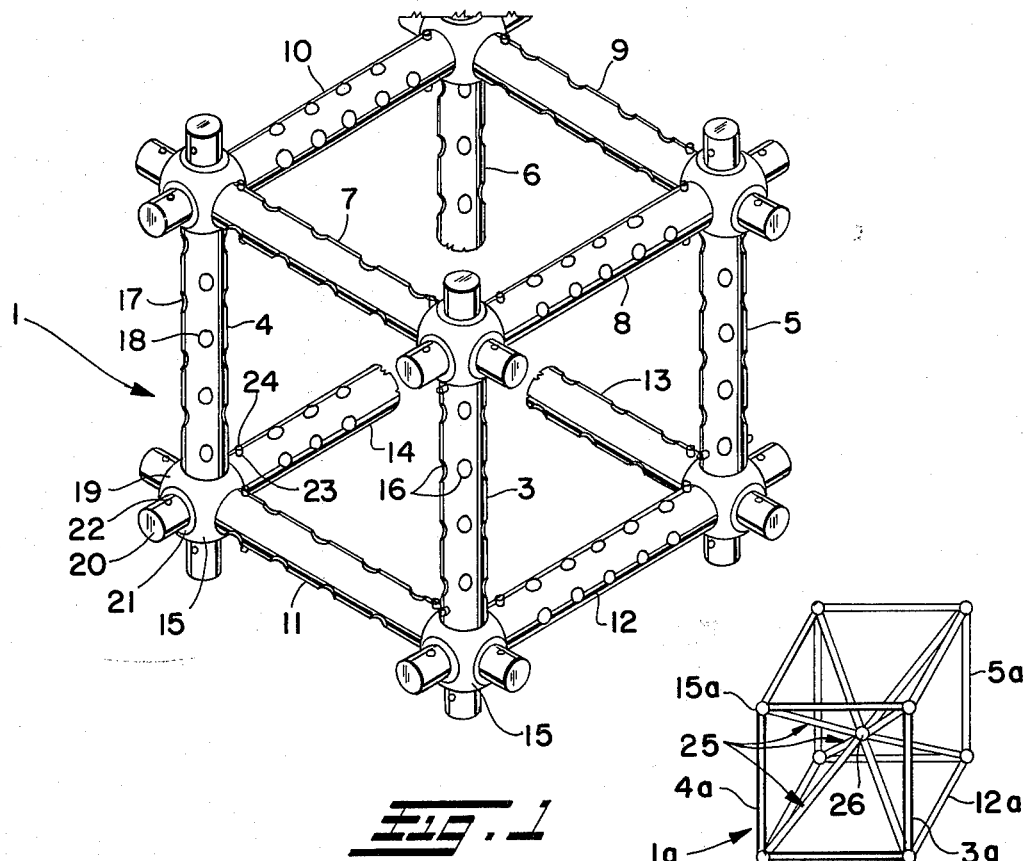
FIG. 1 is an isometric view of a basic structural unit in the form of a cube for use in a lattice framework of the invention.

Referring now to the drawings wherein like reference numerals refer to like elements in the several figures, and initially to FIGS. 1 through 3, a geometric structure which forms a basic structural unit 1 of a lattice framework 2 is comprised of a plurality of elongated members 3 through 14 referred to hereinafter as pipes, and connector members 15. The basic unit 1 illustrated in FIG. 1 is a cube, which includes one forward, two side and one rearward vertical edges defined, respectively, by pipes 3 through 6, four upper edges defined by pipes 7 through 10 and four lower edges defined by pipes 11 through 14. Each of the pipes is securely attached at both ends to respective connector members 15 to establish a rigid cubic structure.

Each of the elongated members or pipes 3 through 14 in FIG. 1 is preferably a cylindrical pipe having a relatively straight longitudinal axis 4' (FIG. 3) and a substantially hollow interior. The pipes may be extruded, molded, cast or otherwise fashioned out of various materials, and in the preferred form of the invention such pipes are made from polymeric or other extrudable material, such as polypropylene or the like. Preferably, the connector members 15 are of the same material as the pipes to facilitate welding and are molded, cast or otherwise formed in a conventional manner.

The cylindrical surfaces of the pipes provide relatively large surface areas per unit weight on which micro-organisms may anchor and accumulate to provide a feeding ground for small fish; if desired, the pipe and/or connector surfaces may be sandblasted or otherwise scored for roughness to facilitate anchoring of microorganisms.

Although the small fish may find the various elements of the lattice 2 quite satisfactory as a shelter behind which they can hide from larger fish, their natural predators, in accordance with the invention a plurality of holes are preferably drilled in the surface of each of the pipes to provide access to the interior thereof. The hole dimensions are such that they are sufficiently large to provide reasonable water circulation within the pipes and to permit the small fish to enter the same, yet sufficiently small to prevent access to the pipe interior by the mentioned larger fish. Moreover, by permitting sufficient light and water flow into the pipe interiors micro-organisms will also begin developing within the pipes, thus permitting the small fish to mature to some extent within the protective seclusion thereof.

The holes in the elongated members may be drilled or otherwise formed in the pipe surfaces at opposed ends of several cross-section diameters thereof at spaced apart positions along the pipe longitudinal axis. If desired, at each such spaced apart cross-section positions, holes may be formed through the pipe at opposed ends of perpendicular cross-section diameters, as illustrated by the holes designated 16 in the pipe 3 of FIG. 1. Moreover, the perpendicular cross-section diameters at which holes are drilled through the pipes may be located at respective spaced apart positions along the pipe longitudinal axis as illustrated, for example, by the holes 17, 18 in pipe 4 in FIGS. 1 and 3. The latter configuration provides for increased pipe strength while the former configuration usually would provide for increased light and water flow in the pipe interior. Other hole designs, for example, where holes are formed at the ends of spaced apart pipe cross-section radii, also may be used within the spirit and scope of the invention.

Each of the connector members 15 includes a substantially spherical body portion 19 from which six cylindrical protrusions 20 extend, each being orthogonal with respect to the other and each preferably joining the body portion 19 at a substantially planar annular shoulder 21. The cross-section diameter of each cylindrical protrusion 20 is approximately equal to the inner diameter of the respective pipes 3 through 14 for insertion therein with the pipe end being positioned in abutment with the annular shoulder 21; and, if desired, the cylindrical protrusions 20 may be slightly tapered to facilitate insertion into the respective pipe interiors.

The pipes 3 through 14 and connector members 15 may be welded, glued, or otherwise fastened together to form the rigid structure of the basic structural unit 1; however, in a preferred form of the invention wherein the elongated and connector members are formed of polymeric material, small attachment openings 22, 23 may be formed, respectively in the cylindrical protrusions 20 and the ends of the pipes 3 through 14 for alignment when properly positioned with respect to each other. After insertion of a protrusion into a pipe and alignment of the openings 22, 23 a steel pin or the like 24 may then be inserted through such aligned openings for temporary attachment of such member, and thereafter, a quantity of solvent may be applied at the abutment of the respective pipe end and shoulder 21 to form a rigid solvent welded joint. Such assembly technique facilitates construction of the overall lattice framework 2, whereby highly skilled workers are not required for assembly of the apparatus, the individual elements of which may be shipped to a shore assembly sight for relatively efficient assembly, and thereafter the assembled or at least partially assembled lattice framework structure may be transported to a water sight and submerged. For example, the lattice may be assembled on shore using at least some pipes with solid exterior surfaces or with removable plugs in the holes for bouyancy. Thereafter, the bouyant lattice may be sunk using weights or by removing such plugs or both whereby the plugs implode due to pressure increase as the lattice sinks. Of course, other assembly and positioning techniques may also be used.

Figure 1A:
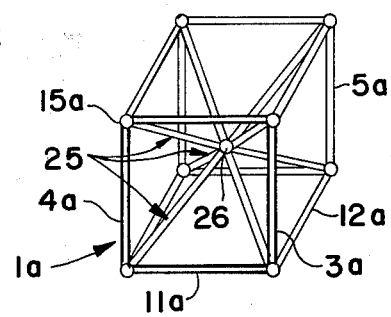
FIG. 1A is a one line diagram of a modified basic structural unit in the form of a body-centered cube.

In FIG. 1A a modified form of basic structural unit 1a is illustrated as a geometric structure in the form of a bodycentered cube. The several elongated members and connector members constituting the modified basic structural unit 1a are similar to corresponding members in the basic structural unit 1 illustrated in FIG. 1, and such members are designated in the instant figure by corresponding reference numerals with the addition of a suffix a. The primary difference between the basic units 1 and 1a are the addition in the latter of eight elongated members designated 25 which extend from respective connector members 15a to a further connector member 26 located at the geometric center of the geometric cube. Thus, the connector member 26 would have eight cylindrical protrusions extending at appropriate angles for attachment to the elongated members 25, and the connector members 15a would have original six protrusions 20 and an appropriate number of additional cylindrical protrusions extending therefrom in order to accommodate the elongated members 25 in the illustrated and adjacent basic structural units 1a to which it is coupled. Although the cube basic structural unit 1 of FIG. 1 is illustrated in detail for understanding of the invention, the body-centered basic structural unit 1a illustrated in FIG. 1A is the preferred form of basic structural unit for use in the invention since the triangular arrangement of members provides high strength with a large number of surface areas in a minimal space allowing reasonable flow and passage characteristics while still being in a relatively fundamental geometric shape. Moreover, other geometric or even non-geometric shapes may be used to define the individual basic structural units for inclusion in the lattice framework 2 of the invention within the spirit and scope thereof.

Figure 2:
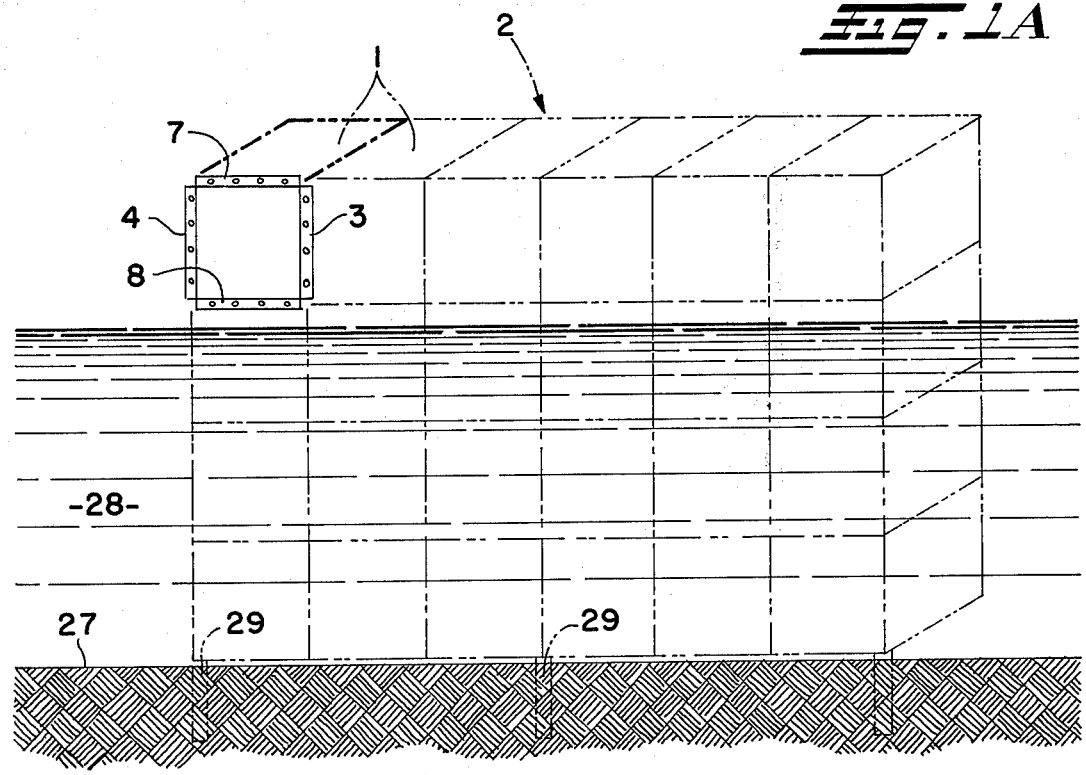
FIG. 2 is a one line diagram of a lattice framework in accordance with the invention positioned relative to a body of water.

Referring now more particularly to FIG. 2, a four by five matrix of basic structural units 1 is illustrated as one section or portion of a lattice framework 2 in accordance with the invention at rest on the bottom 27 of a body of water 28. The lattice 2 may only be set on the bottom 27 without fastening means, especially when the overall lattice framework is sufficiently large so as not to be affected by normal waves and currents; or conventional fastening means schematically indicated at 29 may be used to attach the various elements of the lattice to the bottom 27. Such attaching means may take the form of concrete, metal or wood pilings driven into or placed in the bottom 27 and to which the basic structural units 1 at the bottom of the lattice may be mechanically attached, or other fastening means may also be used. Also, the lattice 2 may be weighted or attached to weights for fixed positioning on the bottom 27. Moreover, if the bottom 27 is not relatively flat, additional elongated members and/or basic units may be designed for location in the lattice framework 2 at hollows formed in the bottom for good support at such hollows. In deep water locations the lattice may be bouyant and anchored and/or weighted for submersion at a desired depth below the water surface.

In FIG. 2 the lattice framework 2 is illustrated primarily as a one line diagram with the three dimensional characteristics of each of the basic structural units 1 comprising the same being illustrated in phantom, and in the upper left unit the elongated members 3, 4, 7 and 11 are indicated for correspondence with the same elements illustrated in FIG. 1. The configuration of structural units 1a illustrated in FIG. 1A or other types or combinations of units and/or designs may be used to form the lattice framework 2. Moreover, if desired the size of each of the basic structural units may be varied, and the openings in the various pipes of each structural unit may be varied to facilitate sheltering fish of different sizes. Thus, small holes in the pipe would permit small fish to enter the same and keep out medium size fish, whereas larger holes would shelter the medium size fish and keep out large fish, it being understood that any fish within the pipe would normally come out of the hole periodically providing an attraction to larger hungry fish and the convenience of the holes would allow the smaller fish to dart back into the shelter area. Also, large size basic structural units in the lattice would permit large fish to swim freely about in the lattice, whereas smaller size units in the lattice would keep out the large fish and shelter medium size fish attracted at least to the perimeter of the lattice while the various pipe holes provide shelter for the small fish from the medium size fish. Therefore, the lattice framework 2 may comprise a number of relatively small, medium and large basic structural units with the smallest fish being bred at the former, followed by migration to the larger and larger structural units as they grow.

In changing the size of the basic structural units used in the lattice framework 2, either additional connecting members 15 may be inserted at respective whole number increments or fractional increments of the length of one edge of such basic structural unit increasing or reducing the overall size, or various tapering and bending of respective elongated members or pipes may be used to extend between small and large structures. Also, in changing the size or shape of the pipes in a given lattice framework 2 the connector members 15 may be designed to provide for such transition.

A further modification of the lattice framework 2 provides strength at the outer periphery thereof to prevent structural damage by very large fish such as sharks which may charge or bite the structure. In such a modification, the pipes constituting the basic structural units about the outer perimeter of the overall lattice framework 2 may be made of a strong material such as steel or other metal to protect the pipe and connectors interior of the lattice framework which may be made of the less strong polymeric variety.

In using the lattice framework 2 as an artifical breakwater the lattice may extend above the high tide water level and a considerable distance in the primary direction of wave travel, such as, for example, at least 100 to 200 feet. Alternatively, the framework 2 may be completely submerged as long as it rises toward the surface to a distance sufficiently close thereto so as to interfere with wave portion or pattern which normally extends downwardly to a depth below the surface approximately equal to the wave height above the surface. Such a lattice artificial breakwater will smooth wave formations by creating randon turbulence and eddies as the wave passes through the lattice converting the wave motion into random motion. Preferably in such an arrangement the open cross-sectional areas perpendicular to the direction of wave travel would be minimized whereby the large forces of waves will not be entirely absorbed by the lattice; rather, the lattice will divert the wave force onto itself resulting in self-diminution in size and strength of the wave. Such an artificial breakwater may be used to provide shelter at off shore unloading or servicing points for deep water bulk carriers while providing the ecological benefit of facilitating fish breeding in the area.

Various types of elongated members which may be used to construct individual basic structural units of the invention for assembly as a lattice framework in a form for example, similar to the lattice framework illustrated at 2 in FIG. 2 are illustrated in FIGS. 3 through 11. Other similar types of elongated members also may be used in the invention to provide both the microorganism food accumulation and sheltering functions of the invention. Moreover, for each of the various types of elongated members illustrated in FIGS. 3 through 11, corresponding connector members similar to those illustrated at 15 in FIG. 1 but adapted for connection of the respective modified elongated members may be used for assembly of the pipes in the lattice framework.

In FIG. 3 the elongated member or pipe 4 corresponds to the pipe of the same reference numeral illustrated in FIGS. 1 and 2. Such pipe includes an outer surface area 31 concentric about a longitudinal axis 4' and on which micro-organisms may anchor, grow and accumulate to provide a food supply for small fish, and a plurality of holes 17, 18 formed at opposed ends of spaced apart cross-section diameters of the pipe 4 provide access to the hollow interior 32 thereof. If it is desired to compartmentalize the pipe interior to provide separate territories or kingdoms for one or more fish facilitating the breeding thereof a solid spacer wall 31a in the form of a divider plug may be inserted between two sections of pipe 30a as illustrated in FIG. 3A, access to the interior compartments being provided through holes 17a, 18a.

A star-shape cross-section pipe 40 in FIG. 4 includes a plurality of fastened planar elements 41 extending parallel to and outwardly from the longitudinal axis 40'. The large exposed surface areas of the planar elements 41 provide for anchoring, growth and accumulation of micro-organisms as a food supply for small fish and actually consist of large amounts of area for such food per unit volume than the cylindrical pipe 4. Moreover, the space proximate the apex 42 at the intersection of two planar elements 41 is relatively small and may serve as a shelter area for small fish. The star-shape pipe design has the advantages of being stronger and providing more surface area than cylindrical pipes, but the latter provides better shelter areas than the former.

The strength advantage of the planar configuration pipe 40 may be incorporated in a hollow-type pipe 40a, as illustrated in FIG. 4A, by insertion of one or more connected planar element dividers 41a in the hollow interior 42a thereof, access to which is provided through holes 43a preferably through only the pipe surface; such pipe configuration may be achieved during a single extrusion operation. Further, if the pipe is to be compartmentalized it can be twisted during its formation by extrusion in spiral shape to form individual compartments in the interior 42b of pipe 40b by the screw-shape planes 41b, as illustrated in FIG. 4B. The line of sight over a distance is thus obstructed in each compartment to form sub-compartments, access to which is provided through holes 43b preferably through only the pipe surface, or if desired, through the interior planes as well.

In FIGS. 5, 6 and 7 hybrid pipe combinations of the pipes illustrated in FIGS. 3 and 4 are illustrated at 50, 60 and 70, respectively. Each hybrid pipe has a cylindrical body 51, 61, 71, substantially hollow interiors 52, 62, 72 and plural outwardly extending planar vanes 53, 63, 73 parallel to longitudinal axes 50', 60', 70'. In FIGS. 6 and 7 the vanes enter the pipe interiors to establish compartments in the same, and respective holes 54, 64, 74 are drilled at least through the bodies 51, 61, 71 for access to the interiors 52, 62, 72, the holes in pipes 50, 70 also being drilled in directions parallel to and through the vanes 53, 73. The holes 74 are formed through the planes in the interior 72 of pipe 70. The hybrid pipes combine the advantages of area, strength and shelter of pipes 4 and 40. Moreover, in any of the hybrid pipes disclosed in which planar element dividers are found within the interior of a cylindrical or square cross-section pipe, the latter described in detail below, or the like, the holes formed in the same may be only through the pipe surface to the interior or also may be formed through one or more of such dividers.

The longitudinal members or pipes 80, 90, 100, 110 illustrated in FIGS. 8 through 11 are similar to those discussed above except that these pipes are based on substantially rectangular cross-sections or perpendicular intersection of planar elements 81, 91, 101, 111. Each pipe extends substantially along a longitudinal axis 80', 90', 100', 110', and each presents large surface areas for anchoring, growth and accumulation of micro-organisms and shelter areas as described.

In FIG. 8 the pipe 80 comprises four planar elements 81 arranged to form a rectangular cross-section pipe hollow at its interior 82 with access to the interior being provided through holes 83, 84 formed at opposed ends of spaced apart pipe cross-section diameters. In this embodiment or in any of the other embodiments of the invention the holes also may be at the ends of respective spaced apart cross-sectional radii or at the opposed ends of two perpendicular cross-sectional diameters of the pipe. The planar elements 91 in FIG. 9 form a back to back E-shape providing large exposed surface areas, and effective shelter areas are defined in the spaces 92 between opposed parallel planar elements. As described above, the hollow pipe 80 provides better shelter characteristics than the pipe 90, although the latter is stronger and has more exposed surface area than the former. The pipes 100, 110 are hybrid combinations of the pipes 80, 90, each having hollow interiors 102, 112 defined by planar elements 101, 111, and each also having plural vanes 103, 113 extending outwardly from the main hollow body portions of the pipes. Moreover, each pipe 100, 110 has holes 104, 114 to the interior thereof, and in pipe 110 the interior 112 is compartmentalized by planar elements 115, the holes 114 being in one or more of the planar elements 111, 115 thereof.

It should now be understood that the invention provides an artificial reef effect for use primarily on continental shelf areas as a fish cultivating apparatus, and, if desired, as an aritifical breakwater. The lattice framework forming the artificial reef provides large surface areas for the anchoring, growth and accumulation of the micro-organisms as a food supply for small fish, while also providing shelter areas for such small fish from larger fish which are their natural predators. Moreover, the small fish naturally attract larger fish and the larger fish attract still larger fish, whereby fish may be spawned, hatched and grown in a single known area to facilitate commercial and/or sport fishing.

The embodiments of the invention in which an exclusive property or provilege is claimed are defined as follows:

1. Apparatus for fish farming, comprising:
   a plurality of elongated means for providing surface areas for the anchoring, growth and accumulation of micro-organisms and the like, said elongated means having a substantially large exterior surface area and each including shelter means providing restricted areas within said elongated means for sheltering relatively small fish from their natural predators including relatively larger fish; and
   means for permanently connecting said elongated means in a rigid three dimensional lattice framework, said lattice framework having relatively large open volumes within which relatively large fish may freely swim about, and said means for sheltering providing said restricted areas for such relatively small fish as a place of refuge from such relatively large fish;

said apparatus thus providing for fish cultivation being attractive to small fish as a supply of food and shelter, whereby larger fish remain proximate said apparatus by attraction to small fish as a food supply.

2. Apparatus for fish farming as set forth in claim 1, each said elongated means comprising a pipe and said shelter means comprising holes formed in said pipe from the exterior to the interior thereof.

3. Apparatus for fish farming as set forth in claim 2, said pipe comprising curved cross section pipe substantially hollow in the interior thereof.

4. Apparatus for fish farming as set forth in claim 3, said pipe comprising circular cross section pipe substantially hollow in the interior thereof.

5. Apparatus for fish farming as set forth in claim 2, said pipe comprising rectangular cross section pipe substantially hollow in the interior thereof.

6. Apparatus for fish farming as set forth in claim 2, wherein said holes are formed in said pipe at opposed ends of respective cross section diameters thereof.

7. Apparatus for fish farming as set forth in claim 6, said holes being formed at opposed ends of perpendicular cross section diameters of said pipe.

8. Apparatus for fish farming as set forth in claim 7, wherein said perpendicular diameters are at spaced apart positions along the longitudinal axis of said pipe.

9. Apparatus for fish farming as set forth in claim 2, further comprising a plurality of substantially planar vanes on the external surface of each said pipe, each such planar vane extending in a direction outwardly from and parallel to the longitudinal axis of said pipe.

10. Apparatus for fish farming as set forth in claim 2, further comprising means for compartmentalizing the interior of said pipe.

11. Apparatus for fish farming as set forth in claim 10, said means for compartmentalizing comprising twisted portions of said pipe about the longitudinal axis thereof.

12. Apparatus for fish farming as set forth in claim 10, said means for compartmentalizing comprising at least one divider having a substantially solid surface area approximately the size and shape of the internal cross sectional area of said pipe and positioned in said pipe substantially perpendicular to the longitudinal axis thereof.

13. Apparatus for fish farming as set forth in claim 10, said means for compartmentalizing comprising a plurality of planar elements internally of said pipe and extending in directions outwardly from and parallel to the longitudinal axis of said pipe.

14. Apparatus for fish farming as set forth in claim 13, wherein said holes are formed in the surface of said pipe and in at least one of said planar elements.

15. Apparatus for fish farming as set forth in claim 13, wherein said holes are formed in the outer surface of said pipe providing access to the interior thereof.

16. Apparatus for fish farming as set forth in claim 13, further comprising a plurality of substantially planar vanes on the exterior surface of said pipe, each vane extending in a direction outwardly and substantially parallel to the longitudinal axis of said pipe.

17. Apparatus for fish farming as set forth in claim 1, said elongated means comprising a plurality of interconnected planar surfaces.

18. Apparatus for fish farming as set forth in claim 17, wherein said plurality of interconnected planar surfaces form a star-shape at a cross section thereof.

19. Apparatus for fish farming as set forth in claim 18, wherein said star shape comprises an asterisk-shape cross section.

20. Apparatus for fish farming as set forth in claim 17, wherein each said planar surface is interconnected to an adjacent planar surface at perpendicular intersections.

21. Apparatus for fish farming as set forth in claim 20, wherein the cross section of said interconnected planar surfaces comprises a back-to-back E-shape.

22. Apparatus for fish farming as set forth in claim 17, wherein said interconnected planar surface define a hollow pipe.

23. Apparatus for fish farming as set forth in claim 22, wherein said hollow pipe comprises a rectangular cross section pipe.

24. Apparatus for fish farming as set forth in claim 23, said pipe comprising a plurality of internal rectangular-shape compartments.

25. Apparatus for fish farming as set forth in claim 24, wherein said shelter means comprises holes formed through the outer surface of said pipe at opposed ends of perpendicular diameters thereof providing access to said compartments.

26. Apparatus for fish farming as set forth in claim 24, wherein said holes are formed in the surface of said pipe to provide access to the interior thereof, and in at least one of the interior walls defining said internal compartments of said pipe.

27. Apparatus for fish farming as set forth in claim 1, wherein said lattice framework comprises a geometric framework including a plurality of basic structural units, each of the latter in the form of a body centered cube.

28. Apparatus for fish farming as set forth in claim 1, wherein said lattice framework comprises a geometric framework including a plurality of basic structural units, each of the latter in the form of a cube.

29. Apparatus for fish farming as set forth in claim 1, further comprising means for anchoring said framework to the bottom of a body of water.

30. Apparatus for fish farming as set forth in claim 1, wherein said framework is of sufficient size to provide breakwater function.

31. Apparatus for fish farming as set forth in claim 30, wherein said framework extends when submerged in a body of water above the water surface.

32. Apparatus for fish farming as set forth in claim 1, wherein said elongated means comprise steel.

33. Apparatus for fish farming as set forth in claim 1, wherein said elongated means comprise polymeric material.

34. Apparatus for fish farming as set forth in claim 1, wherein said elongated means at the outer perimeter of said framework comprises steel and said elongated means interiorly of said outer perimeter of said framework comprising polymeric material.

35. Apparatus for fish farming, comprising:
a plurality of elongated means for providing surface areas for the anchoring, growth and accumulation of micro-organisms and the like, said elongated means having a substantially large surface area and each including shelter means providing restricted areas within said elongated means for sheltering small fish from their natural predators;

means for connecting said elongated means in a rigid three dimensional lattice framework; and said elongated means and said means for connecting including holes for alignment when assembled, a rigid pin insertable into said holes, and means for solvent welding said elongated means and said means for connecting when retained in temporary connected position by said inserted pin.

36. Apparatus for fish farming as set forth in claim 35, wherein each said means for connecting includes a main body portion with a substantially solid exterior surface and a plurality of protruding members extending therefrom adapted for coupling to respective elongated members to form said framework.

37. Apparatus for fish farming as set forth in claim 36, wherein said elongated members are hollow and said protruding members are adapted to fit into respective hollows.